United States Patent
Song et al.

(10) Patent No.: US 7,987,728 B2
(45) Date of Patent: Aug. 2, 2011

(54) PIEZOCERAMIC-BASED SMART AGGREGATE FOR UNIFIED PERFORMANCE MONITORING OF CONCRETE STRUCTURES

(75) Inventors: Gangbing Song, Pearland, TX (US);
Haichang Gu, Houston, TX (US);
Yi-Lung Mo, Bellaire, TX (US)

(73) Assignee: The University of Houston System, Houston, TX (US)

( * ) Notice: Subject to any disclaimer, the term of this patent is extended or adjusted under 35 U.S.C. 154(b) by 11 days.

(21) Appl. No.: 11/825,370

(22) Filed: Jul. 6, 2007

(65) Prior Publication Data
US 2008/0034884 A1 Feb. 14, 2008

Related U.S. Application Data

(60) Provisional application No. 60/819,202, filed on Jul. 7, 2006.

(51) Int. Cl.
*G01M 7/00* (2006.01)
(52) U.S. Cl. .......................................... 73/786; 73/803
(58) Field of Classification Search .................. 73/786, 73/803
See application file for complete search history.

(56) References Cited

U.S. PATENT DOCUMENTS

| | | | | |
|---|---|---|---|---|
| 4,480,480 A | * | 11/1984 | Scott et al. | 73/769 |
| 4,849,668 A | * | 7/1989 | Crawley et al. | 310/328 |
| 5,421,204 A | * | 6/1995 | Svaty, Jr. | 73/786 |
| 5,507,188 A | * | 4/1996 | Svaty, Jr. | 73/786 |
| 5,520,055 A | * | 5/1996 | Fussinger | 73/762 |
| 6,069,433 A | * | 5/2000 | Lazarus et al. | 310/333 |
| 6,076,405 A | * | 6/2000 | Schoess | 73/587 |
| 6,240,783 B1 | * | 6/2001 | McGugin et al. | 73/594 |
| 6,781,285 B1 | * | 8/2004 | Lazarus et al. | 310/332 |
| 6,928,881 B2 | * | 8/2005 | Brennan | 73/766 |
| 7,065,846 B2 | * | 6/2006 | Schreiner et al. | 29/25.35 |
| 7,117,742 B2 | * | 10/2006 | Kim | 73/587 |
| 7,180,404 B2 | * | 2/2007 | Kunerth et al. | 340/10.41 |
| 7,197,931 B2 | * | 4/2007 | Kim | 73/587 |
| 7,234,519 B2 | * | 6/2007 | Fripp et al. | 166/250.01 |
| 7,286,964 B2 | * | 10/2007 | Kim | 702/183 |
| 7,325,456 B2 | * | 2/2008 | Kim | 73/587 |
| 7,325,605 B2 | * | 2/2008 | Fripp et al. | 166/250.01 |
| 7,377,179 B2 | * | 5/2008 | Anderson | 73/767 |
| 7,429,813 B2 | * | 9/2008 | Walter et al. | 310/328 |
| 7,536,912 B2 | * | 5/2009 | Kim | 73/632 |

(Continued)

OTHER PUBLICATIONS

G. Song, H. Gu, Y.L. Mo, T. Hsu, H. Dhonde and R.R.H. Zhu, Health Monitoring of a Concrete Structure Using Piezoceramic Materials; Smart Structures and Materials 2005: Sensors and Smart Structures Technologies for Civil, Mechanical, and Aerospace Systems, Proc. of SPIE vol. 5765 (SPIE, Bellingham, WA, 2005) (13 pages).

(Continued)

*Primary Examiner* — Freddie Kirkland, III
(74) *Attorney, Agent, or Firm* — Robert W Strozier

(57) ABSTRACT

A system for monitoring the health of a structure, e.g., a concrete wall, bridge, pillars, using a smart aggregate is disclosed. The smart aggregate includes a piezoceramic transducer(s) and associated communication links. The transducer is embedded into the structure prior to the manufacture of the structure. The disclosed system can monitor internal stresses, cracks and other physical forces in the structures during the structures' life. The system is capable of providing an early indication of the health of the structure before a failure of the structure can occur.

19 Claims, 19 Drawing Sheets

U.S. PATENT DOCUMENTS

| | | | |
|---|---|---|---|
| 7,590,510 B2 * | 9/2009 | Kim | 702/183 |
| 7,596,470 B2 * | 9/2009 | Kim | 702/183 |
| 7,656,076 B1 * | 2/2010 | Pletner et al. | 310/340 |
| 7,729,035 B2 * | 6/2010 | Kim | 359/287 |
| 2004/0078170 A1 * | 4/2004 | Di Marzio | 702/188 |
| 2004/0200613 A1 * | 10/2004 | Fripp et al. | 166/250.01 |
| 2005/0061076 A1 * | 3/2005 | Kim | 73/587 |
| 2006/0260402 A1 * | 11/2006 | Kim | 73/587 |
| 2007/0228874 A1 * | 10/2007 | Nagaya et al. | 310/315 |
| 2008/0203851 A1 * | 8/2008 | Pletner et al. | 310/317 |
| 2008/0218026 A1 * | 9/2008 | Pletner et al. | 310/314 |

OTHER PUBLICATIONS

Steven D. Glaser, Hui Li, Ming L. Wang, Jinping Ou and Jerome Lynch, Sensor technology innovation for the advancement of structural health monitoring: a strategic program of US-China research for the next decade; Smart Structures and Systems, vol. 3, No. 2 (2007) (24 pages).

* cited by examiner

PIEZOCERAMIC-BASED SMART AGGREGATE FOR UNIFIED PERFORMANCE MONITORING OF CONCRETE STRUCTURES

CROSS-REFERENCE TO RELATED APPLICATION

This application claims benefits from U.S. provisional application Ser. No. 60/819,202 filed Jul. 7, 2006, the entire contents of which are hereby incorporated herein by reference.

FIELD OF THE INVENTION

This invention is related to the field of monitoring devices and, more specifically, to the field of performance monitoring of concrete structures.

BACKGROUND OF THE INVENTION

Current early-age concrete evaluation devices, such as the maturity meter, cannot be applied for the detection and evaluation of cracks and damage for the maintenance period. Some other early-age concrete evaluation devices, such as ultrasonic wave velocity meters, require bulky equipment and are not suitable for the health monitoring of in-situ, large-scale concrete structures.

The current maturity meter measures the hydration heat of a concrete structure and the hydration time at early-age to estimate the strength development of a concrete structure. An ultrasonic velocity meter evaluates some physical properties of a concrete structure by measuring the velocity of ultrasonic waves propagated inside the concrete structure.

Compressive test equipment determines the compressive strength data of concrete by directly compressing and crushing the concrete specimens (structure) but, due to the press method, equipment and other uncertain factors, large amounts of concrete specimens are needed for the test which is time-consuming and effort consuming.

The present technological methods to evaluate the strength of concrete at early-age can be classified into two categories: (1) destructive method that crushes the concrete for strength testing and (2) non-destructive testing.

Two popular non-destructive methods to evaluate the early-age strength development of concrete are the hydration heat-based method and the ultrasonic wave velocity-based method. Hydration heat-based method evaluates the early-age strength development of concrete by measuring the hydration heat and recording the hydration time. This kind of method cannot be applied to the health monitoring of concrete structure after the concrete strength is fully developed.

The ultrasonic velocity-based method applies an ultrasonic meter on the surface of concrete structure to measure the velocity of the ultrasonic waves from the surface to evaluate the concrete strength. The shortcoming of this method is that the variation of the wave velocity of the ultrasonic waves is not sensitive to the strength of the concrete. A ten percent increment of strength may only result in less than one percent increment of the wave velocity.

Early-age concrete performance is an important and critical issue for the construction of the concrete structures. The construction speed and the quality evaluation of concrete at an early-age are the major concerns for the construction of civil concrete structures. After the concrete is cured, the detection of the existence and growth of cracks and damage is another important issue for the maintenance of civil concrete structures.

It is an object of the present invention, therefore, to extend the lifetime of concrete structures. It is a further object of the invention to enhance the safety of concrete buildings. It is also an object of the present invention to reduce the maintenance effort and cost for concrete structures.

BRIEF SUMMARY OF THE INVENTION

The invention is a novel unified performance-monitoring device (based on piezoelectricity) for concrete structures. A smart aggregate is directly embedded into a concrete structure at the desired location before casting and can be used, not only for early-age strength monitoring of concrete, but also for the health monitoring (crack and damage detection and evaluation) of concrete structure after the concrete strength has been fully developed.

A method for monitoring the health of a structure, comprising the steps of: coating piezoceramic transducers with an insulating material; embedding the piezoceramic transducers into a housing; embedding the housing into the structure; inducing a first waveform from a first piezoceramic transducer; and displaying a second waveform received by a second piezoceramic transducer. The structure of this method is composed of concrete. The step of embedding the housing occurs prior to the curing of the concrete. The piezoceramic transducers are composed of lead zirconate titanate. The housing is a cubic concrete block. The insulating material is composed of water-proof insulating layers.

This invention reduces the maintenance cost and effort of civil concrete structures and is also capable of giving precaution warnings before the failure of concrete structures.

This invention has the advantages of low cost, unified evaluation of concrete from early-age through the life-time, and easy implementation.

This invention has the potential to be manufactured in large quantities of commercial product as a meter for early-age performance evaluation and health monitoring (crack detection and evaluation) for civil concrete structures. The commercial product, based on this invention, will have a very competitive price and offer promising profits for civil construction companies, civil maintenance companies and related industrial companies.

The commercial market for the invented device is an obvious promising one due to the reason that the invented device is a great necessity for the early-age performance evaluation, the health monitoring during the maintenance period of large-scale concrete structures, such as bridges, buildings, and pillars. The safety and the life-time of the concrete structure are greatly improved by using the invented device.

DETAILED DESCRIPTION OF THE INVENTION

Figure 1:
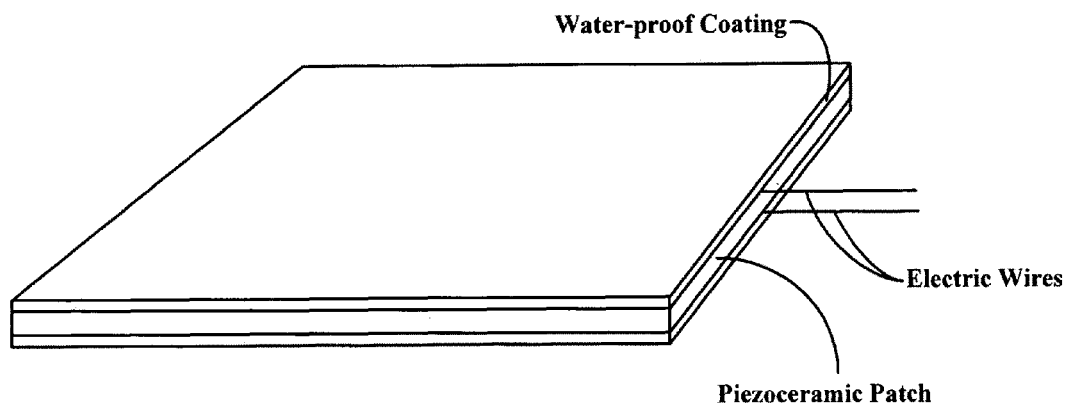
FIG. 1 is a perspective illustration of the piezoceramic transducer with waterproof coating.

The present invention is a piezoceramic-based smart aggregate 100 (see FIG. 1) for unified performance monitoring of concrete structures 102 and the method of making the smart aggregate 100. A piezoceramic transducer 104 is formed from a piezoceramic patch 106 with electric wires 108 and a waterproof, insulating coating 110.

One preferred embodiment of the smart aggregate 100, as shown in FIG. 1, contains an 8 mm×8 mm×0.267 mm piezoceramic patch 106, the waterproof insulating coating 110, two soldered electric wires 108 on two sides of the piezoelectric patch 106 that are all embedded in a small cubic concrete block 112. This is meant by way of example and is not intended to limit the scope of the invention.

This smart aggregate 100 of the present invention has three obvious advantages over the current technology for early-age concrete performance evaluation:

(1) The smart aggregate 100 can be applied to the evaluation of concrete performance from the beginning of the hydration period through the life-time maintenance period. Other current, early-age concrete evaluation devices cannot be applied for the health monitoring (crack detection and evaluation) during the maintenance period.

(2) The present invention 100 is suitable for the performance evaluation of the in-situ, large-scale concrete structures 102 which may be inaccessible for other current devices (not shown) to evaluate the early-age concrete performance.

(3) The present invention 100 is very economical. The cost of one invented device 100 is approximately one dollar which is much less than the current transducer (not shown) for early-age concrete performance evaluation.

Figure 2:
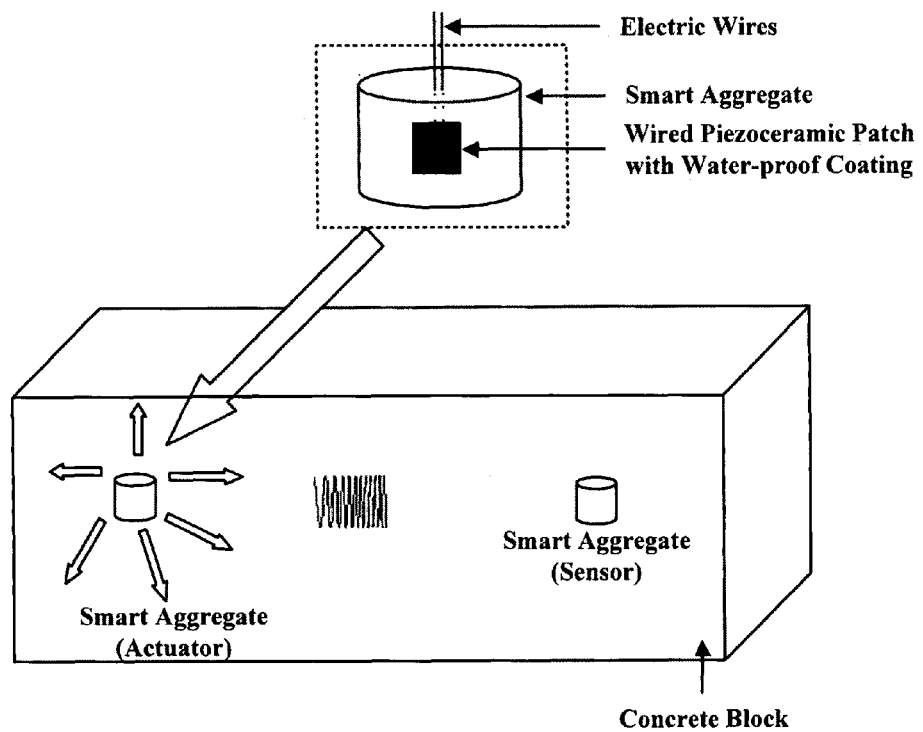
FIG. 2 is an exploded view of smart aggregates embedded in a concrete structure.

FIG. 2 shows the smart aggregate 100 embedded in the concrete structure 102.

Figure 3:
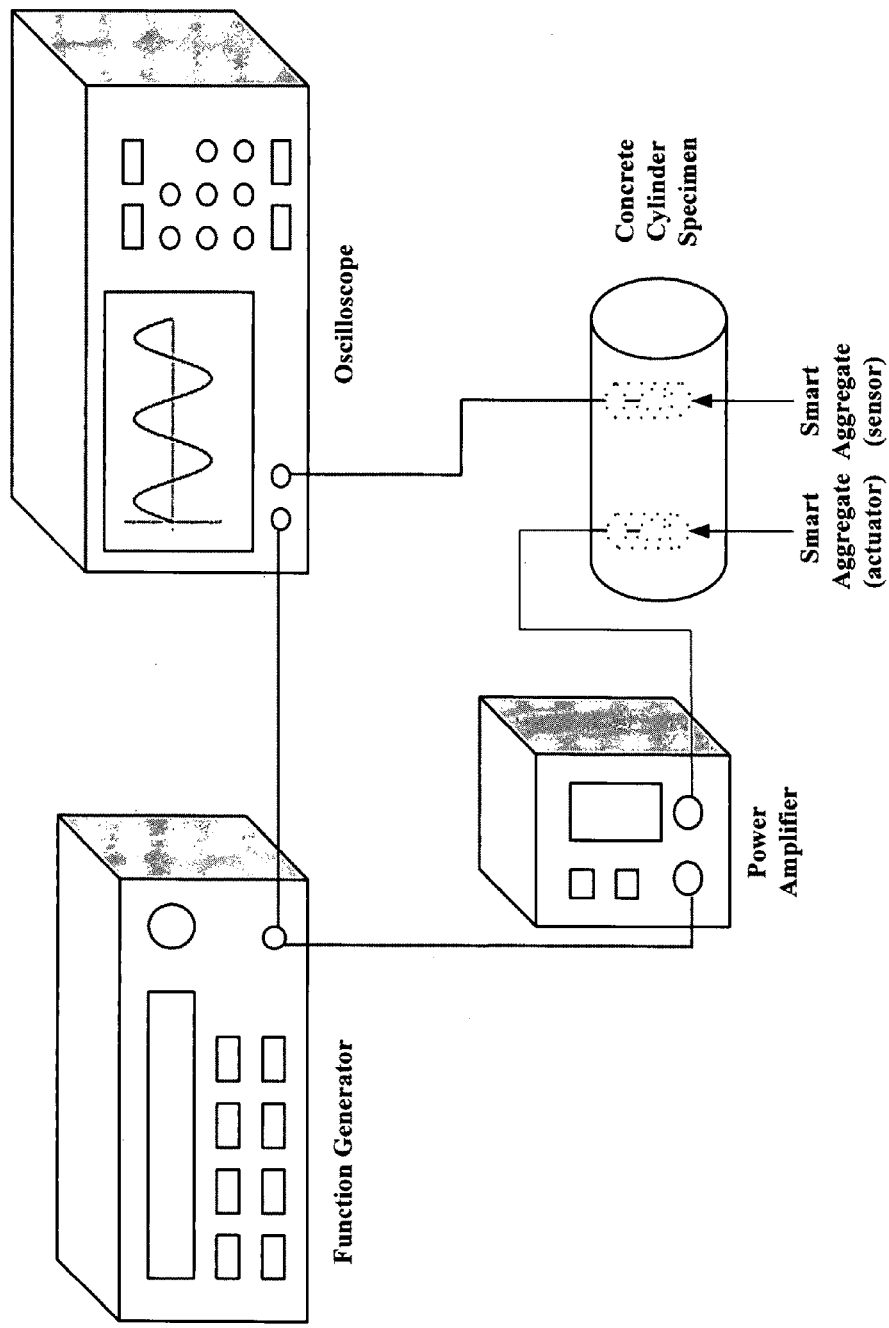
FIG. 3 illustrates the experimental setup for strength testing and health monitoring testing.

FIG. 3 is a preferred embodiment of an experimental testing system 120 for strength testing and health monitoring testing. The system 120 includes two smart aggregates (embedded in a concrete cylinder specimen 306) that are attached to industry standard devices (such as a function generator 300, a power amplifier 302, and an oscilloscope 304) via the electric wires 108. The smart aggregate 100 can be used as either an actuator 100a or sensor 100s as depicted in FIG. 2. The function generator 300 and the power amplifier 302 generate a signal to the smart aggregate 100a to induce a mechanical force (shown in FIG. 2). The mechanical force is detected by the smart aggregate 100s and the smart aggregate 100s provides a signal to the oscillator 304. The mechanical This test setup is meant by way of example and is not meant to limit the scope of the invention.

Method of Creating

To protect the piezoelectric patch 106 from water and moisture, the patch 106 is coated with waterproof coating layers 110 as shown in FIG. 1. The smart aggregate 100, as shown in FIG. 2, is manufactured by embedding the coated, piezoelectric patch 106 into a small, cubic concrete block 112. The smart aggregate 100 is then positioned at a predetermined place in the concrete structure 102 before casting, as shown in FIG. 2. This invention 100 is then used to conduct early-age strength monitoring and health monitoring after the concrete strength is fully developed.

The present invention uses a novel treatment of the piezoceramic transducer 104. The piezoceramic transducer can be constructed from various ceramic materials, such as lead (plumbum) zirconate titanate (PZT). The piezoceramic transducer 104 is first coated with water-proof insulating layers 110 and then embedded into a cubic concrete block 112 to form the smart aggregate 100. The smart piezoceramic-based aggregates 100 are then directly embedded into the concrete structure 102 to evaluate the performance of the concrete in the structure 102.

Test Results for the Invention

Concrete cylinders with smart aggregates were tested. The strength monitoring experimental data verified the effectiveness of the invention to monitor the strength development of concrete at early ages. The health monitoring experimental data verified the effectiveness of the invention to be applied to the health monitoring of the concrete structure.

Figure 4:
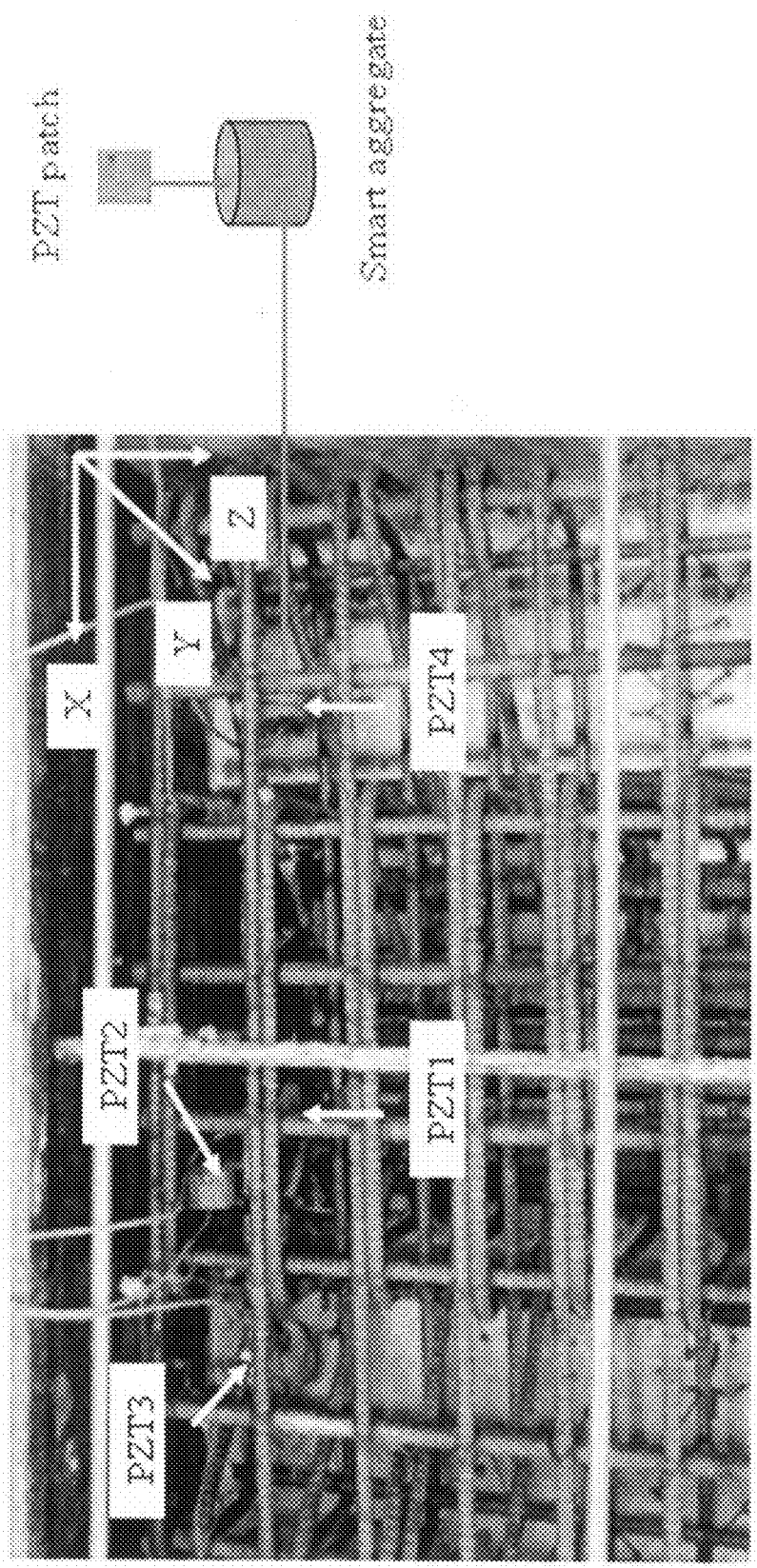
FIG. 4 shows a concrete bent-cap (structure) with four smart aggregates embedded.
Figure 5:
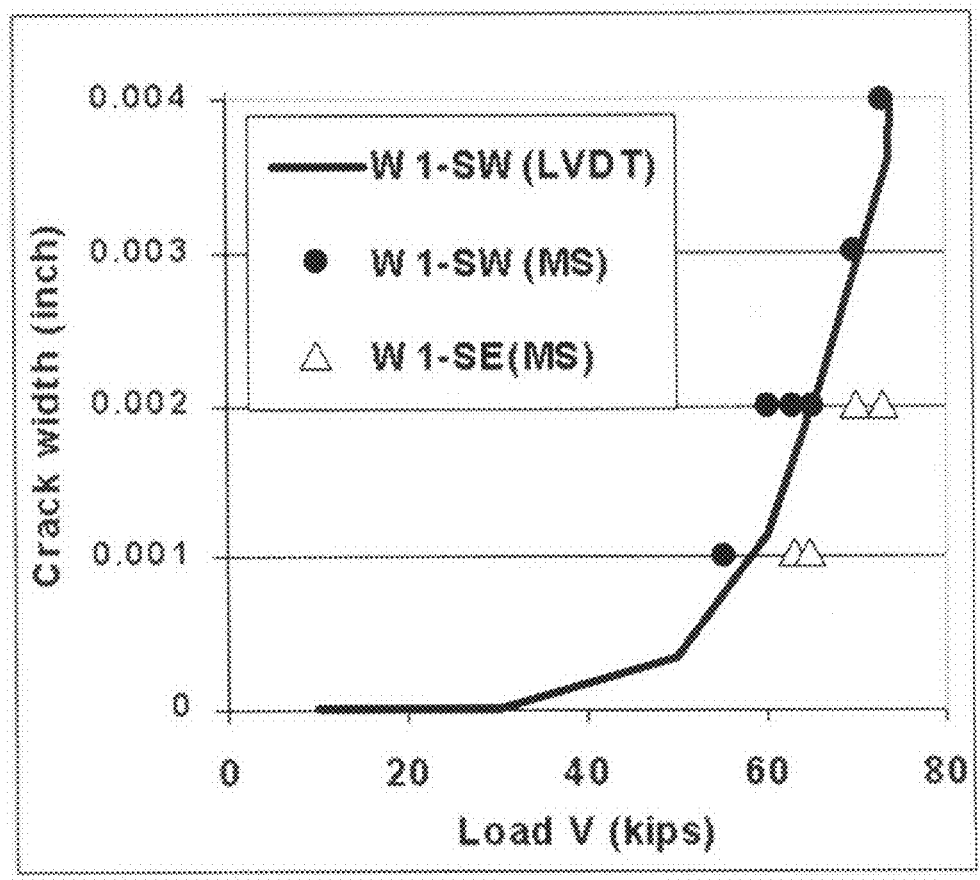
FIG. 5 is a chart illustrating the crack width measured by microscope and LVDT.

The following figures show the results of the testing which are an impressive improvement over current methods:

FIG. 4 shows one test of four smart aggregates 100 embedded into a concrete bent-cap concrete structure 102. FIG. 5 is a chart of the test results (measured by microscope and LVDT) showing Crack Width vs Load V.

Figure 6:
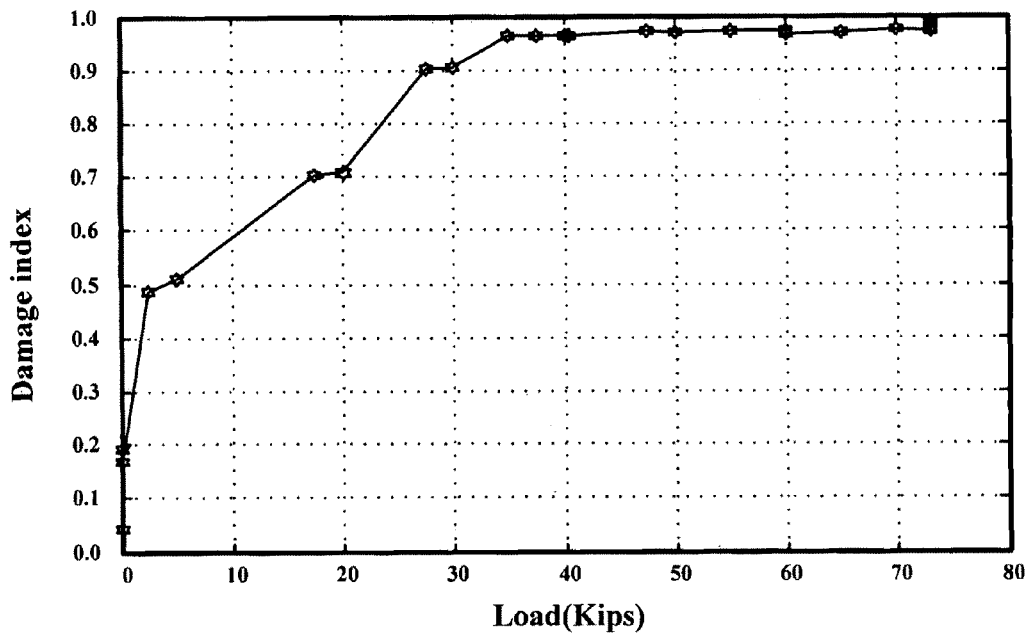
FIG. 6 is a chart showing the damage index curve vs. load of PZT2.
Figure 7:
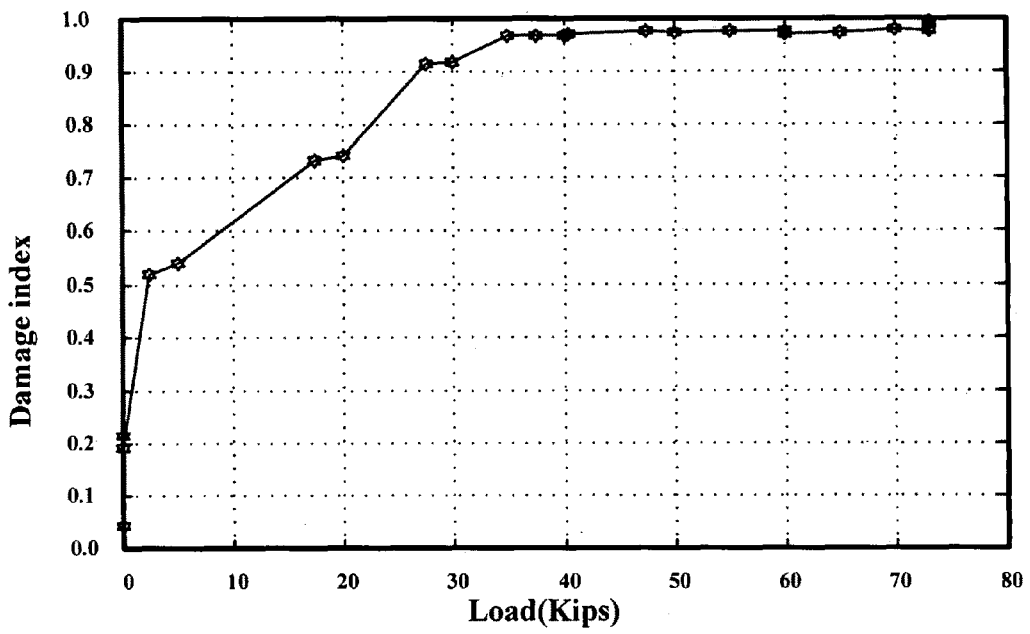
FIG. 7 is a chart showing the damage index curve vs. load of PZT3.
Figure 8:
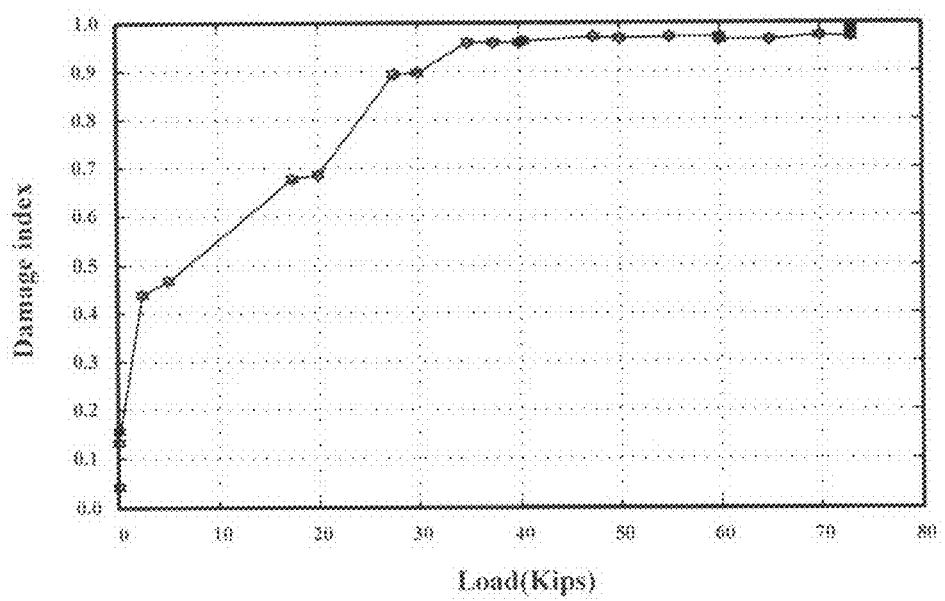
FIG. 8 is a chart showing the damage index curve vs. load of PZT4.

FIGS. 6-8 are charts showing the results of the Damage Index vs. Load for actuator PZT1 and sensors PZT2, PZT3 and PZT4, respectively.

Figure 9:
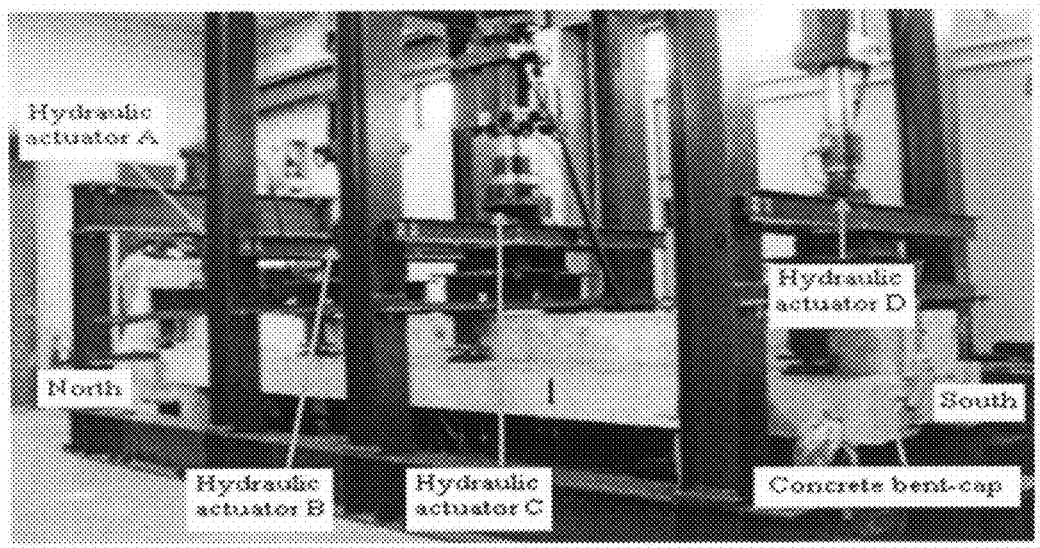
FIG. 9 is a photograph of a test frame setup with the reinforced concrete bent-cap specimen.

FIG. 9 is a photograph of a test frame setup with the reinforced concrete bent-cap specimen 102 and four hydraulic actuators (A-D).

Figure 10:
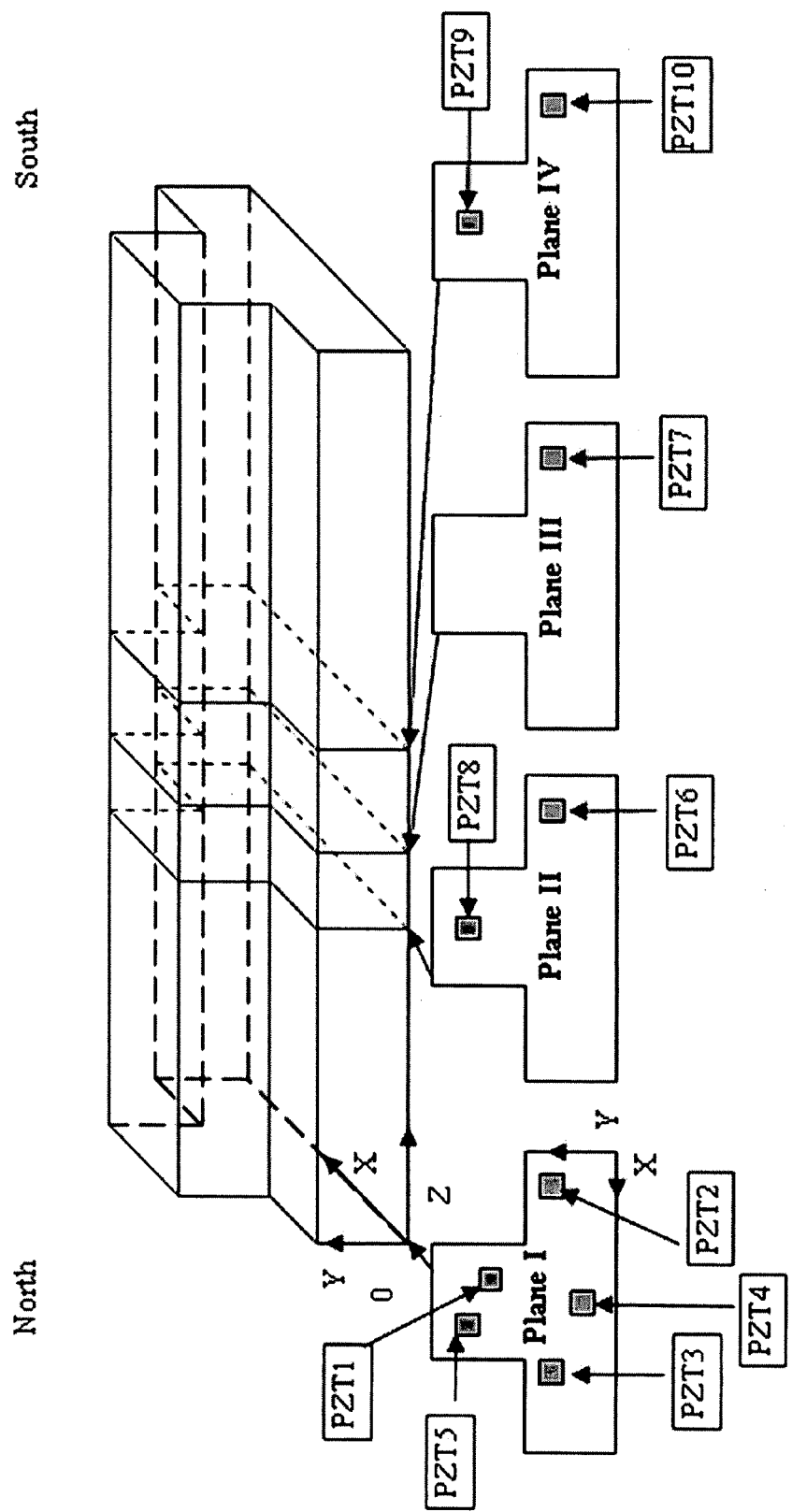
FIG. 10 is a perspective view of the present invention showing the location of smart aggregates.

FIG. 10 is a view of the test frame setup showing the location of the smart aggregates (PZT1-PZT10) 100.

Figure 11:
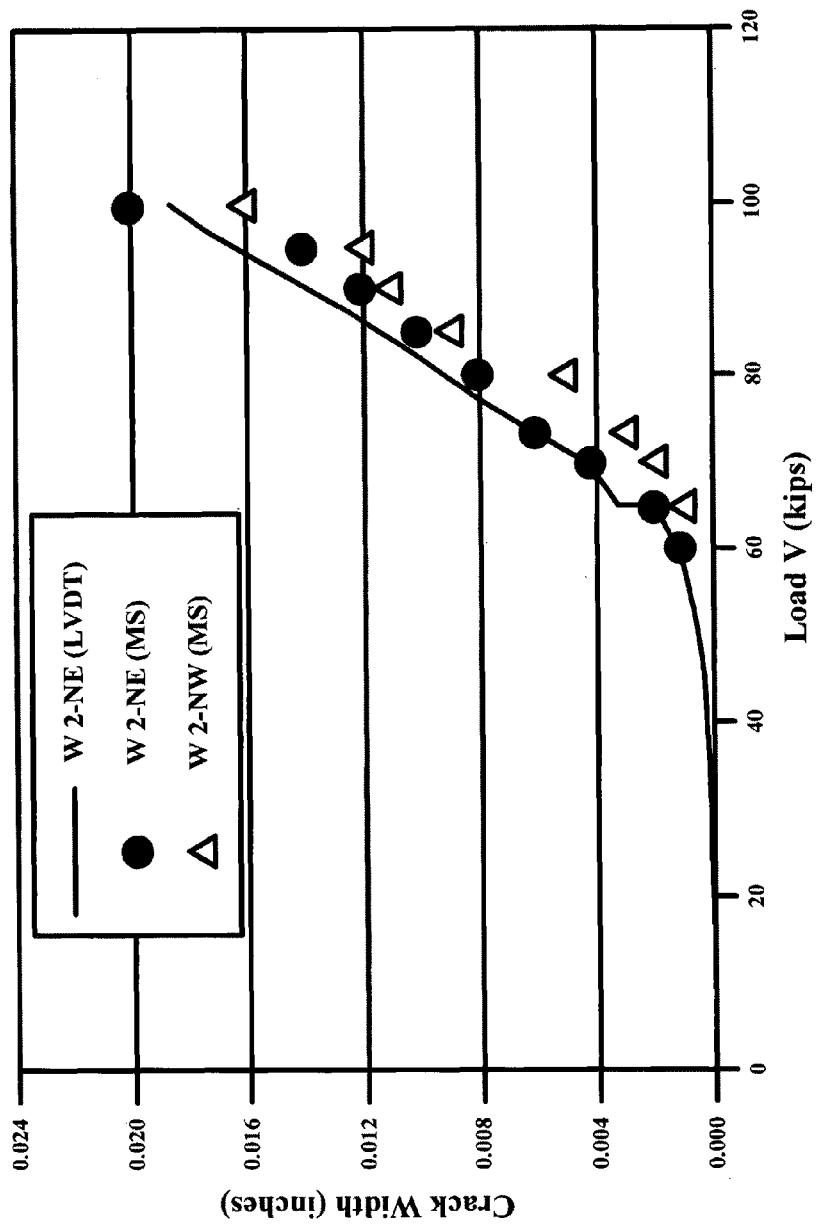
FIG. 11 is a chart showing the crack width measured by microscope (MS) and LVDT.

FIG. 11 is a chart of the crack width measured by microscope and LVDT.

Figure 12:
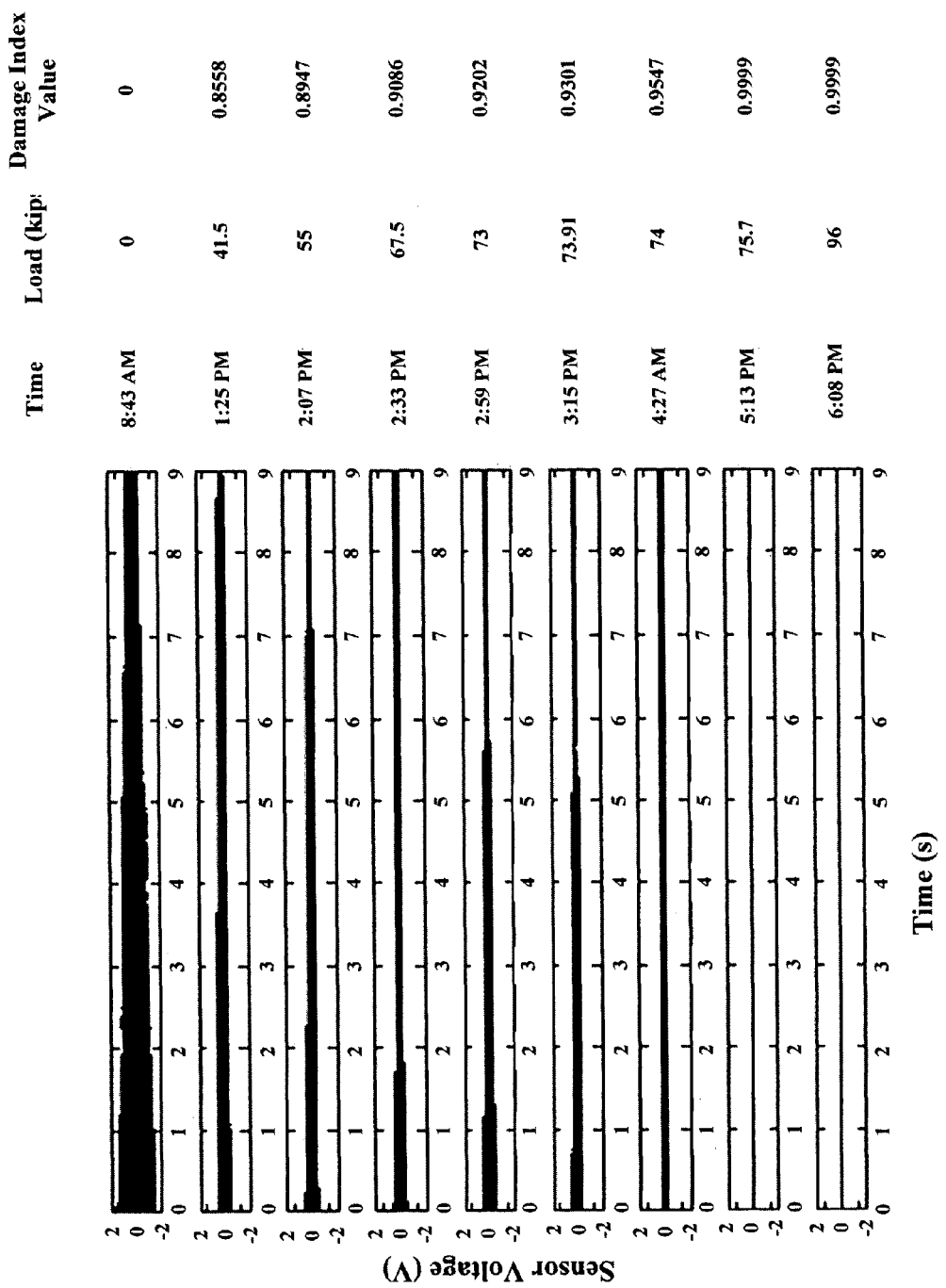
FIG. 12 is a chart of the time response of PZT10 with PZT3 as actuator excited by the sweep sine (100-10 k Hz).
Figure 13:
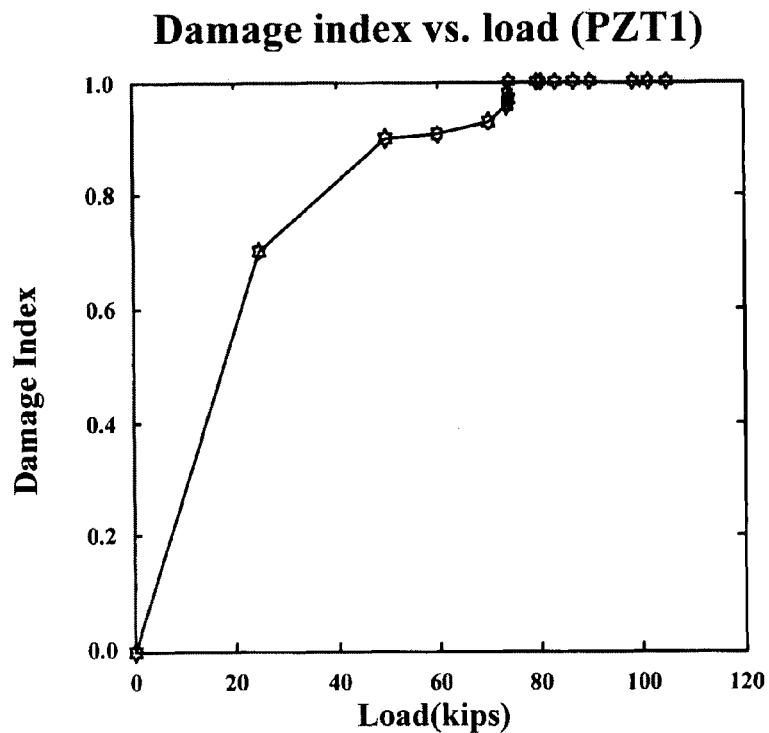
FIG. 13 is a chart of the damage index vs. load for PZT1 with PZT3 as actuator.
Figure 14:
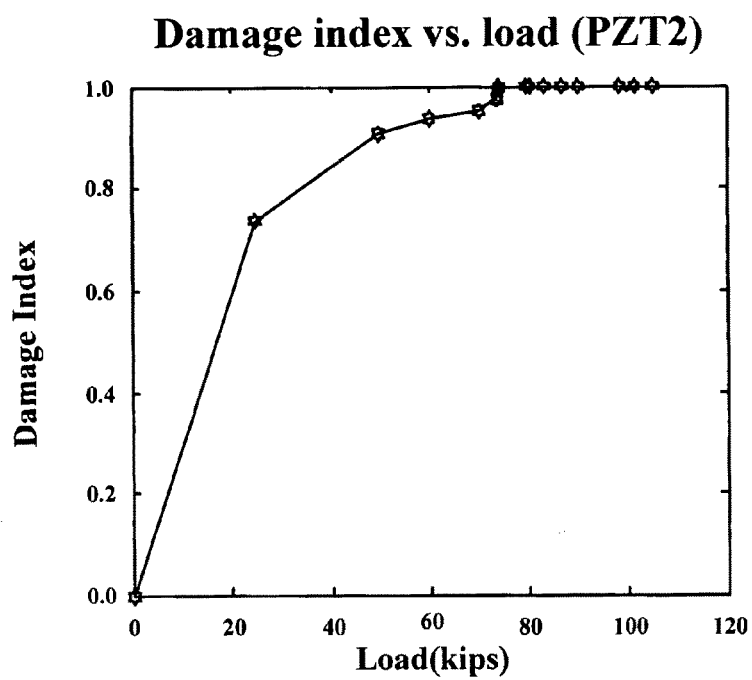
FIG. 14 is a chart of the damage index vs. load for PZT2 with PZT3 as actuator.
Figure 15:
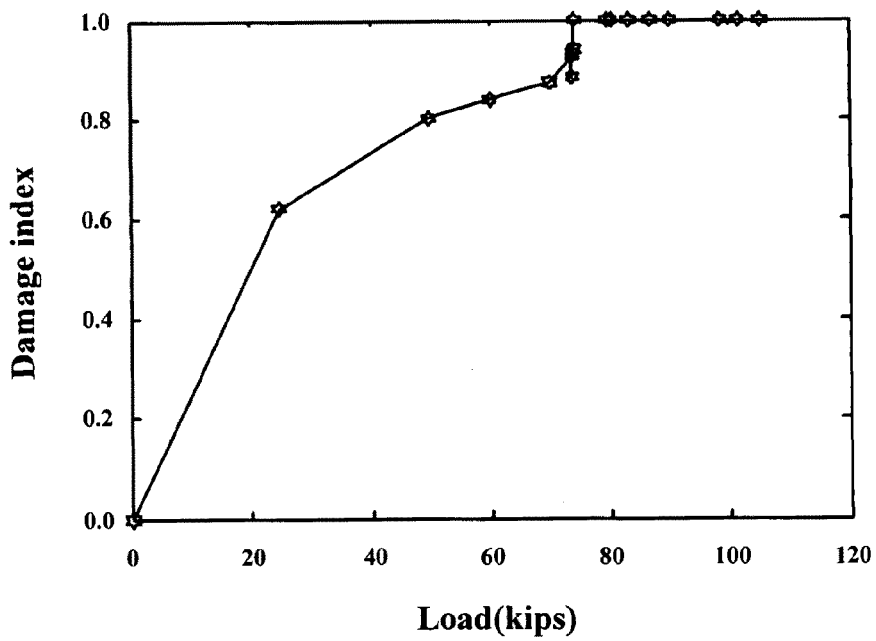
FIG. 15 is a chart of the damage index vs. load for PZT5 with PZT3 as actuator.
Figure 16:
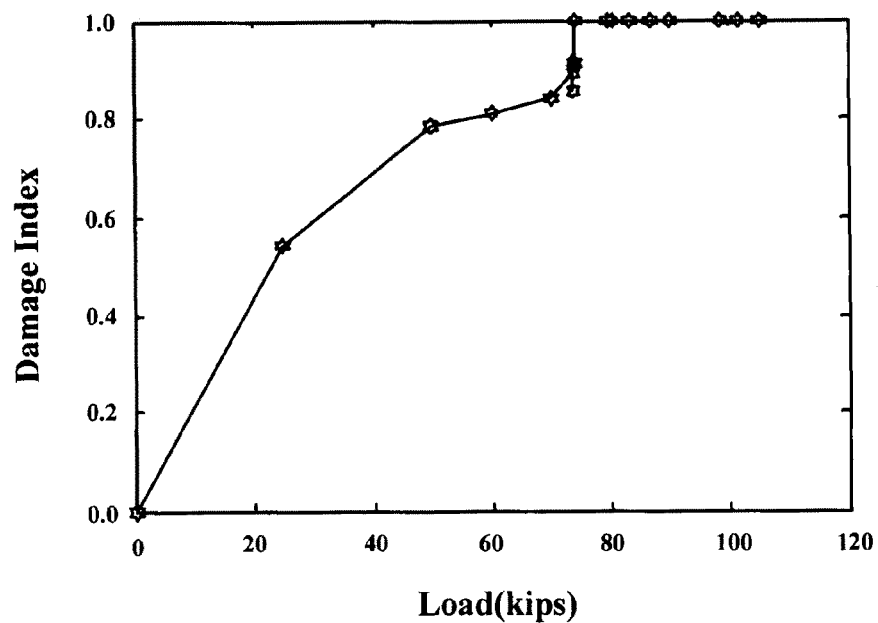
FIG. 16 is a chart of the damage index vs. load for PZT8 with PZT3 as actuator.
Figure 17:
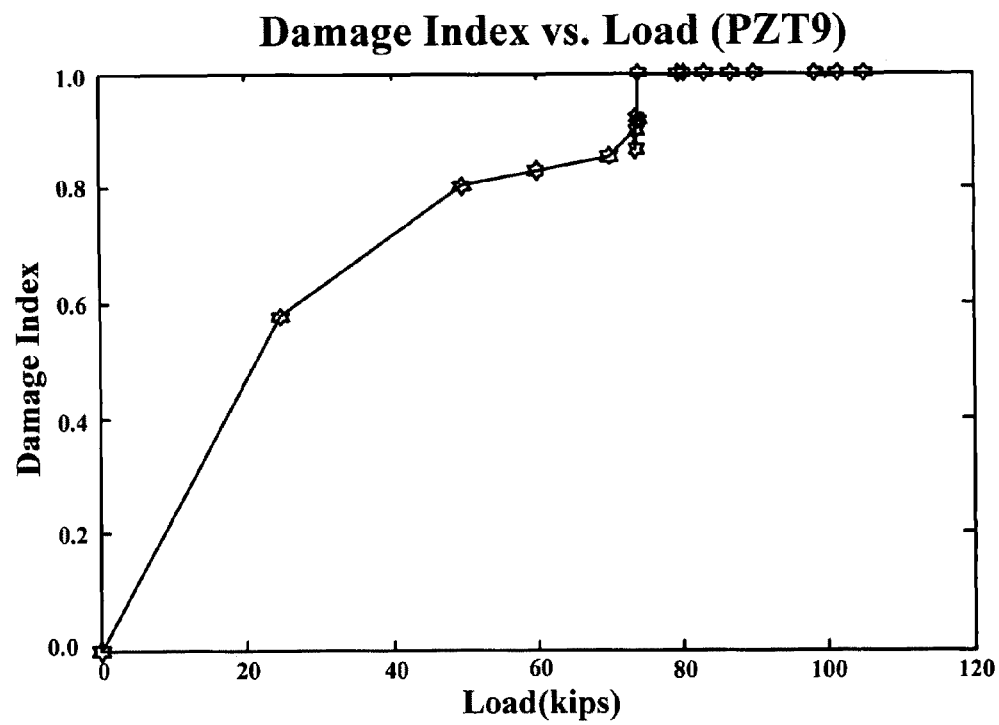
FIG. 17 is a chart of the damage index vs. load for PZT9 with PZT3 as actuator.
Figure 18:
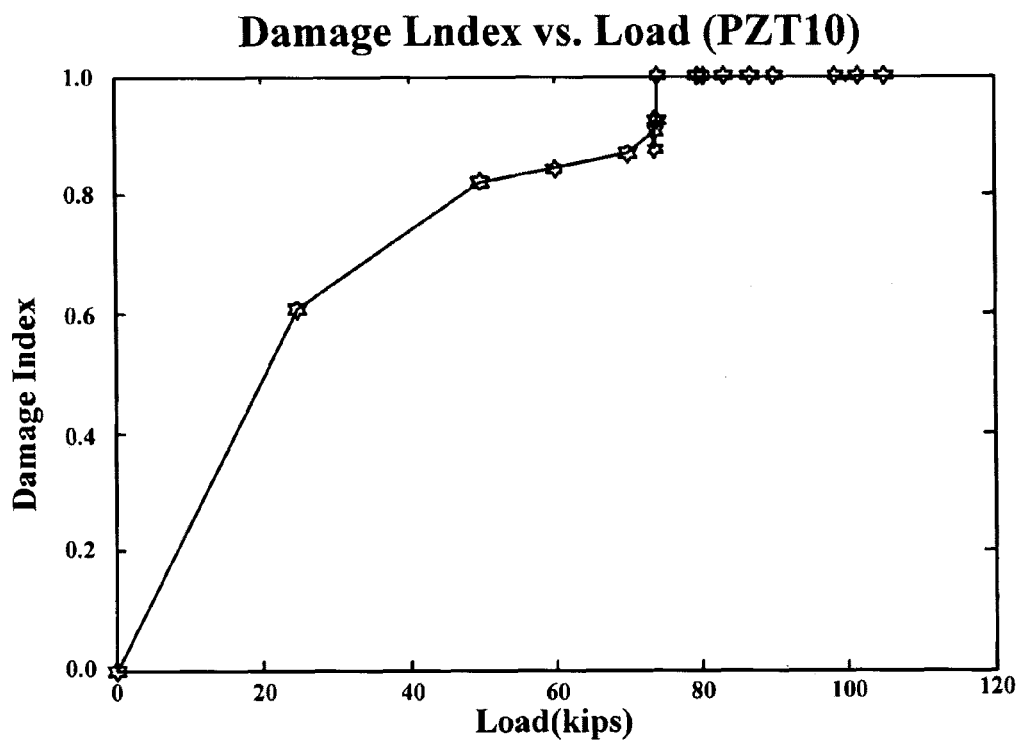
FIG. 18 is a chart of the damage index vs. load for PZT10 with PZT3 as actuator.

FIG. 12 is a graph of the sensor voltage vs. time showing the time response of PZT10 with PZT3 as actuator excited by the sweep sine (100-10 k Hz).

FIGS. 13-18 are graphs showing the Damage Index vs. load for PZT1, PZT2, PZT5, PZT8, PZT9 and PZT10, respectively, with PZT3 as the actuator (sweep sine 10-100 Hz).

Figure 19:
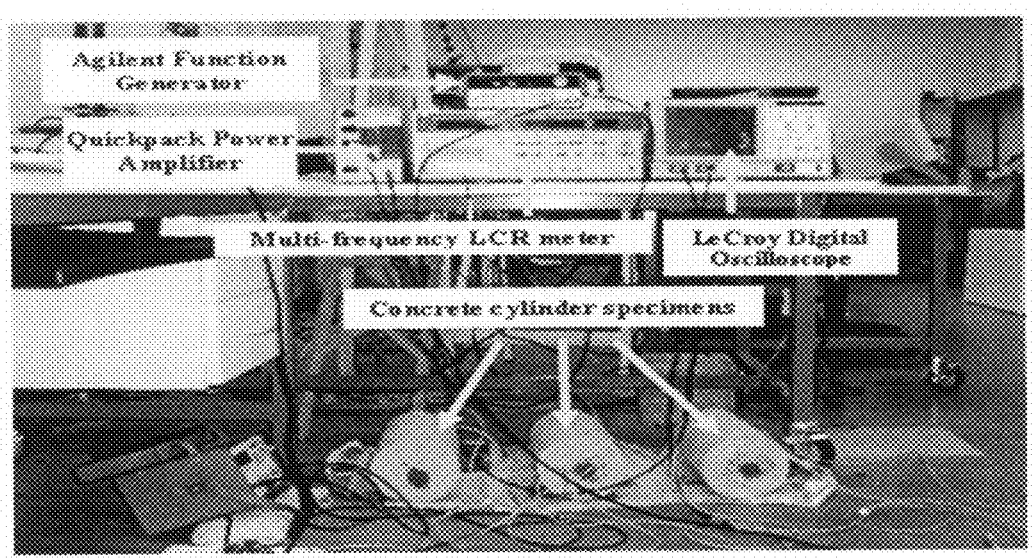
FIG. 19 is a photograph of an experimental setup for early-age strength monitoring of concrete specimens.

FIG. 19 is a photograph of an experimental setup for early-age strength monitoring of concrete specimens using an Agilent Function Generator, a Quickpack Power Amplifier, a Multifrequency LCR meter, a LeCroy Digital Oscilloscope and three concrete cylinder specimens.

Figure 20:
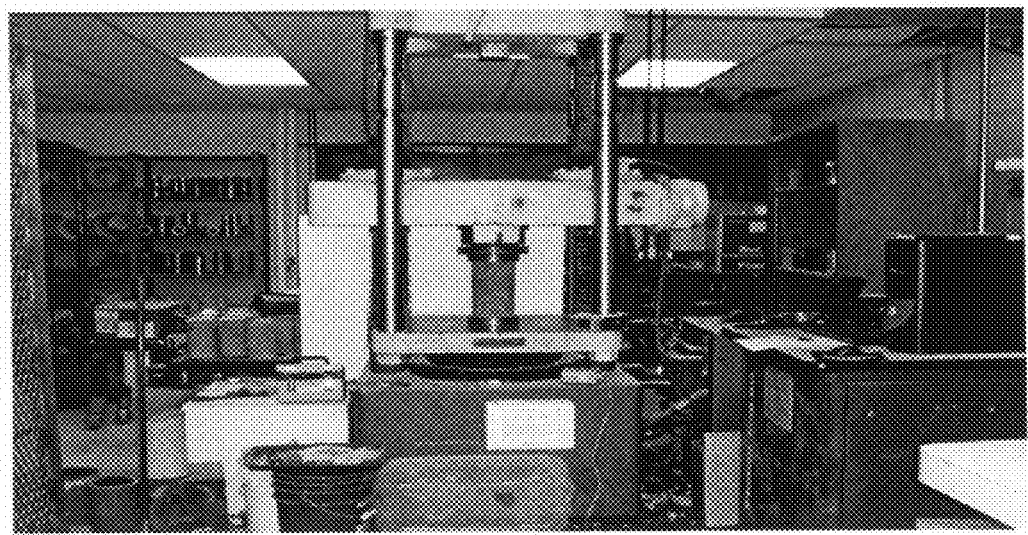
FIG. 20 is a photograph of a Universal compression testing machine for concrete cylinder compressive testing.

FIG. 20 is a photograph of a Universal compression testing machine for concrete cylinder compressive strength testing.

Figure 21:
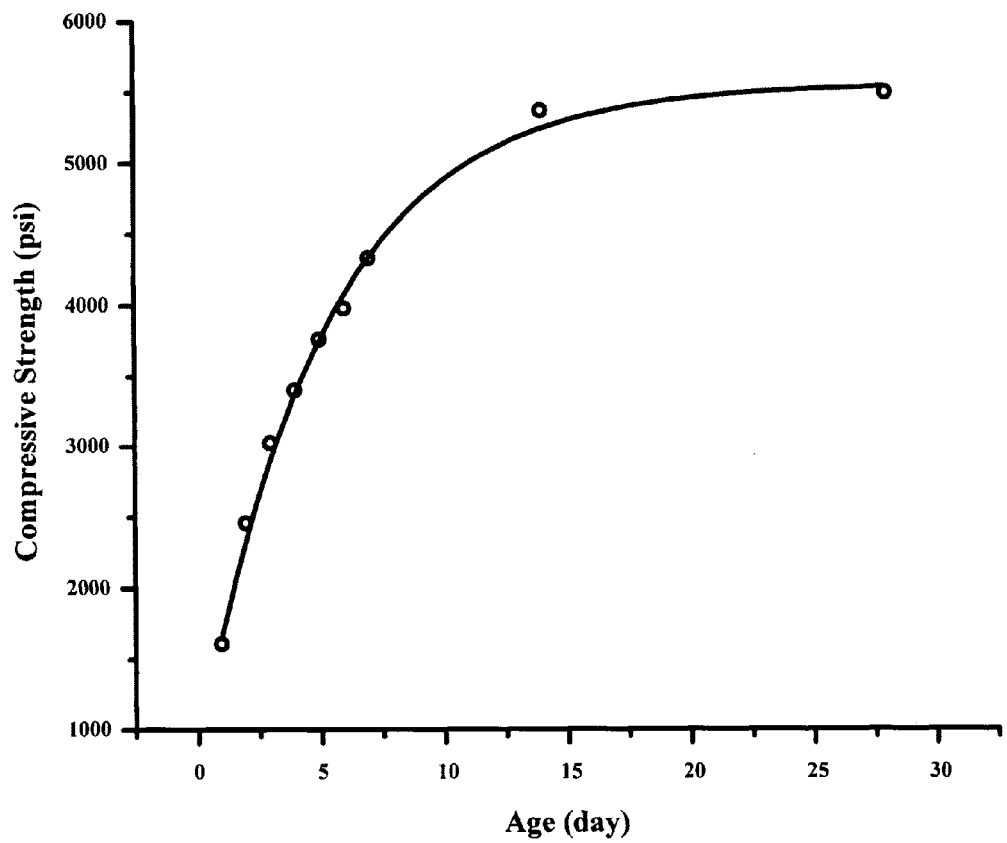
FIG. 21 is a chart showing the compressive strength of the concrete vs. age.

FIG. 21 is a graph showing the compressive strength vs age (days) for the testing done on the Universal compression testing machine.

Figure 22:
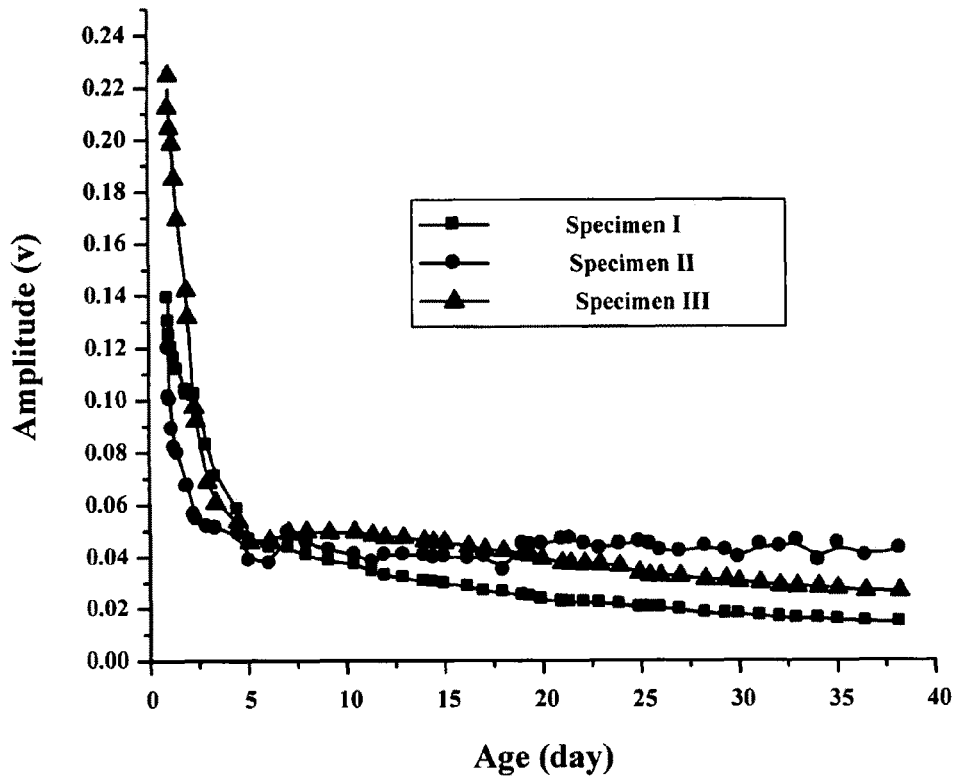
FIG. 22 is a chart showing the amplitude of specimens I, II and III for 60k harmonic response.
Figure 23:
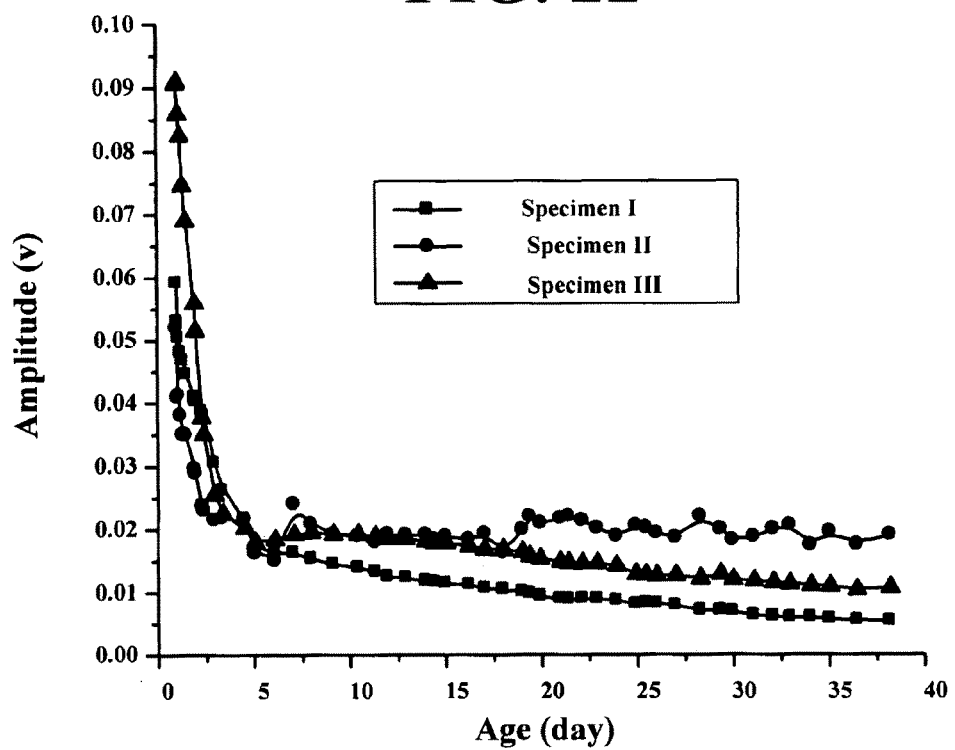
FIG. 23 is a chart showing the amplitude of specimens I, II and III for 100k harmonic response.

FIGS. 22-23 are graphs showing the amplitudes of specimens 308a, b, c (see FIG. 19) for 60k and 100k harmonic response, respectively.

Figure 24:
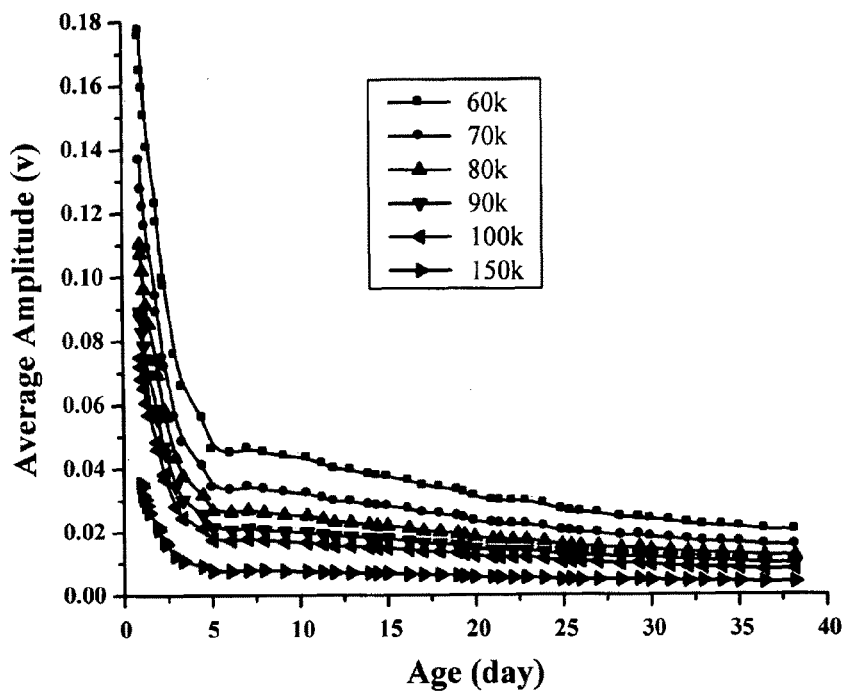
FIG. 24 is a chart showing the average value of the amplitude of different harmonic excitation.
Figure 25:
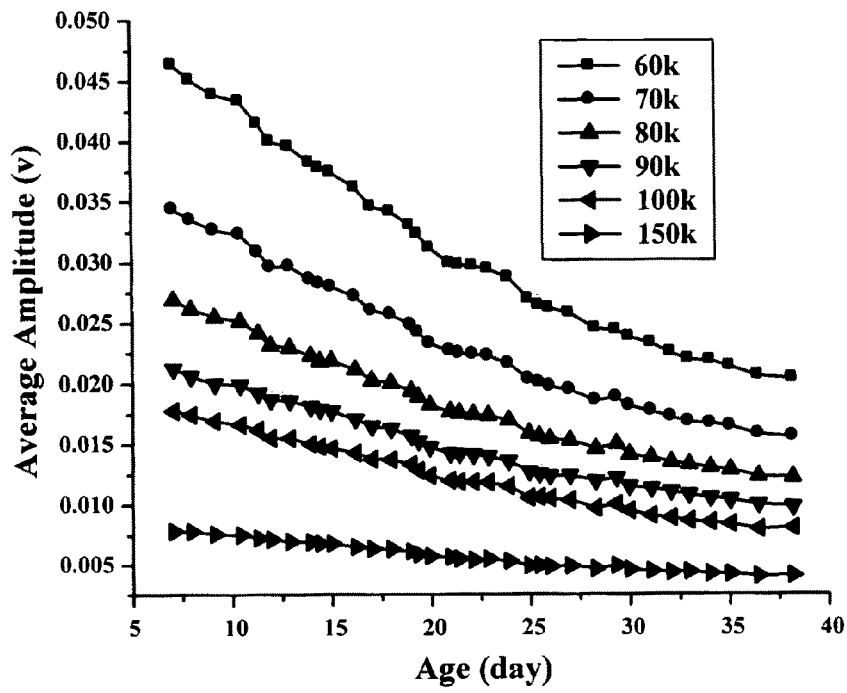
FIG. 25 is a chart of the average value of the amplitude of different harmonic excitation after the seventh day.

FIGS. 24-25 are graphs showing the average values of the amplitude of different harmonic excitation for various days.

Figure 26:
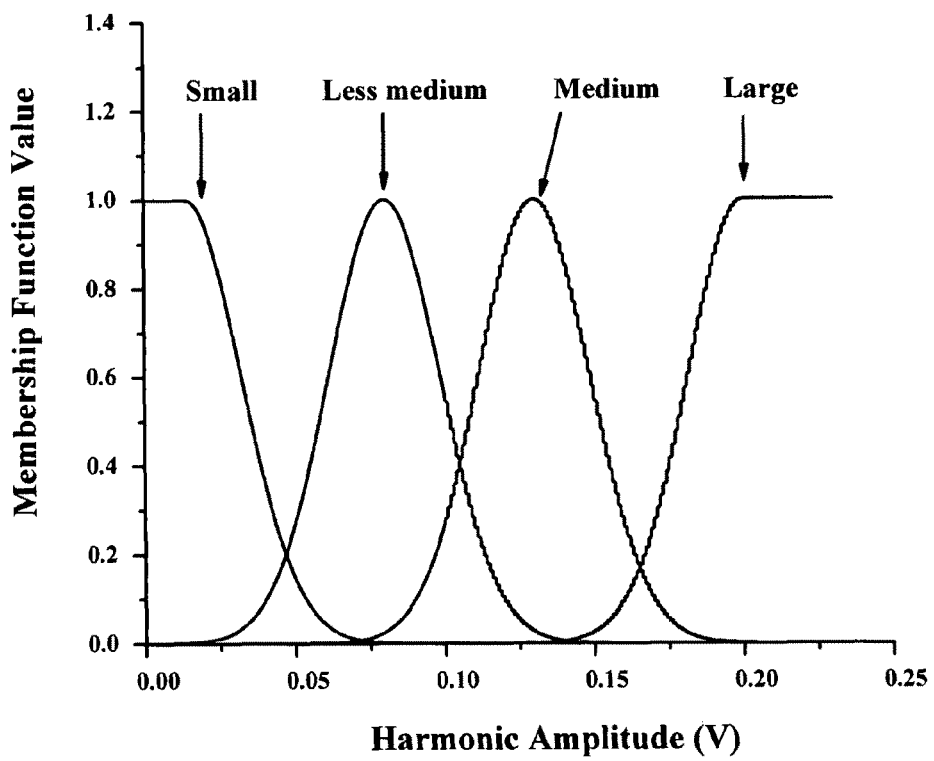
FIG. 26 is a chart of the membership function of the input variable (harmonic amplitude).
Figure 27:
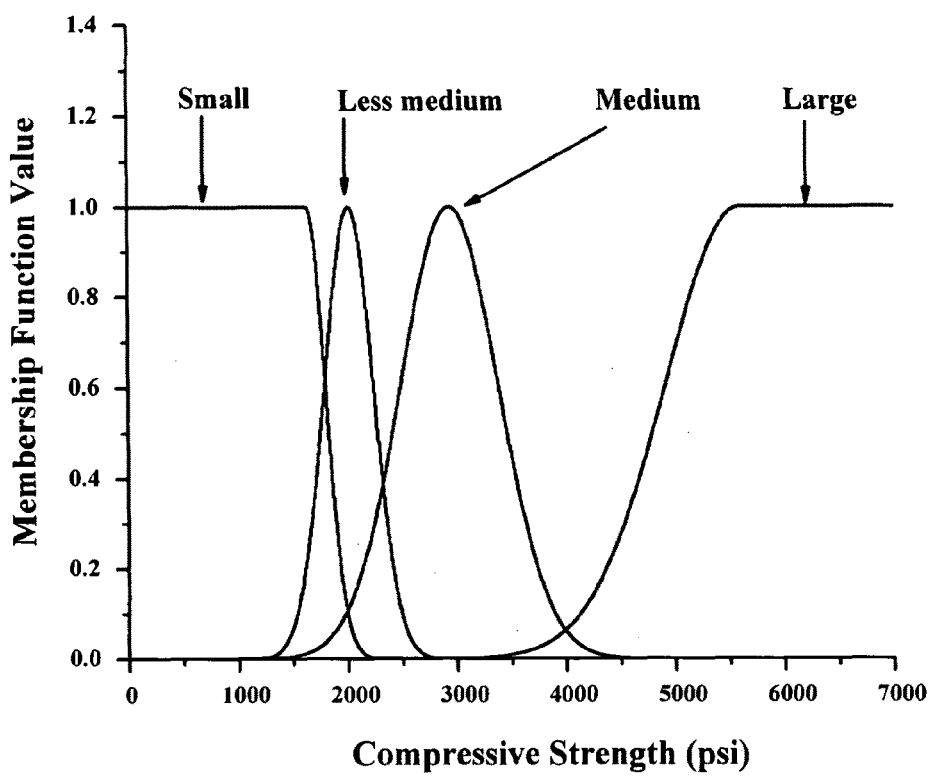
FIG. 27 is a chart of the membership function of the output variable (compressive strength).

FIGS. 26-27 are graphs showing the membership function of input (harmonic amplitude) and output (compressive strength) variables, respectively.

Figure 28:
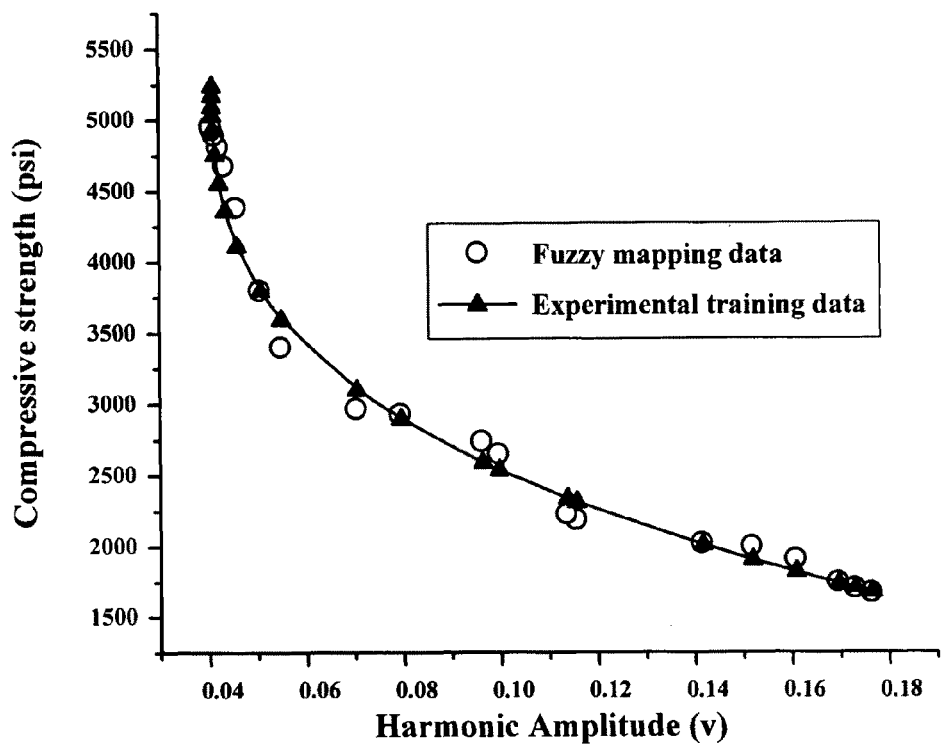
FIG. 28 is a chart showing the experimental training data and the fuzzy mapping data.
Figure 29:
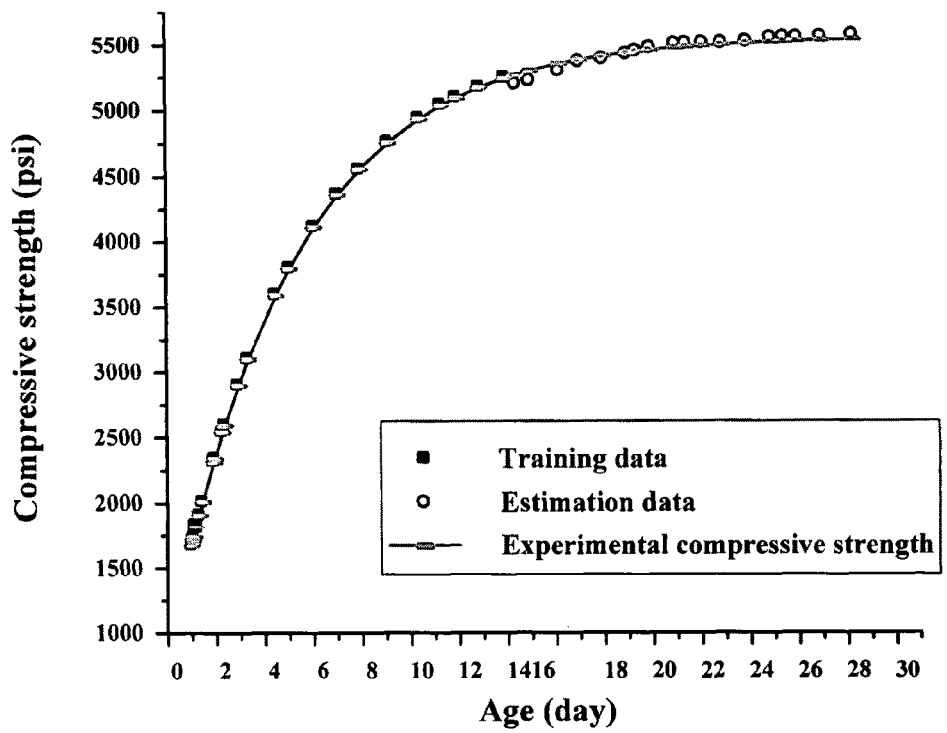
FIG. 29 is a chart showing the experimental compressive strength and the estimated compressive strength.

FIG. 28 is a graph showing the experimental training data and the fuzzy mapping data and FIG. 29 shows the experimental compressive strength and the estimated compressive strength.

Figure 30:
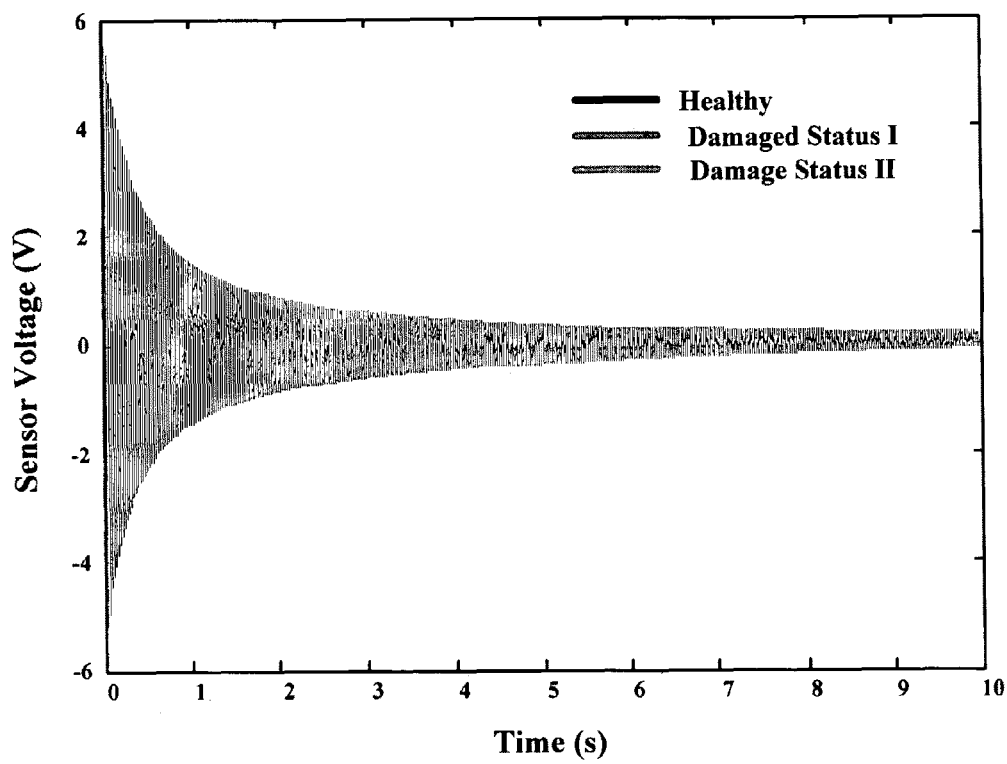
FIG. 30 is a chart of the experimental data for healthy monitoring of concrete cylinder specimen.

FIG. 30 is a graph of the experimental data for health monitoring of concrete cylinder specimen (sensor voltage vs. time).

Figure 31:
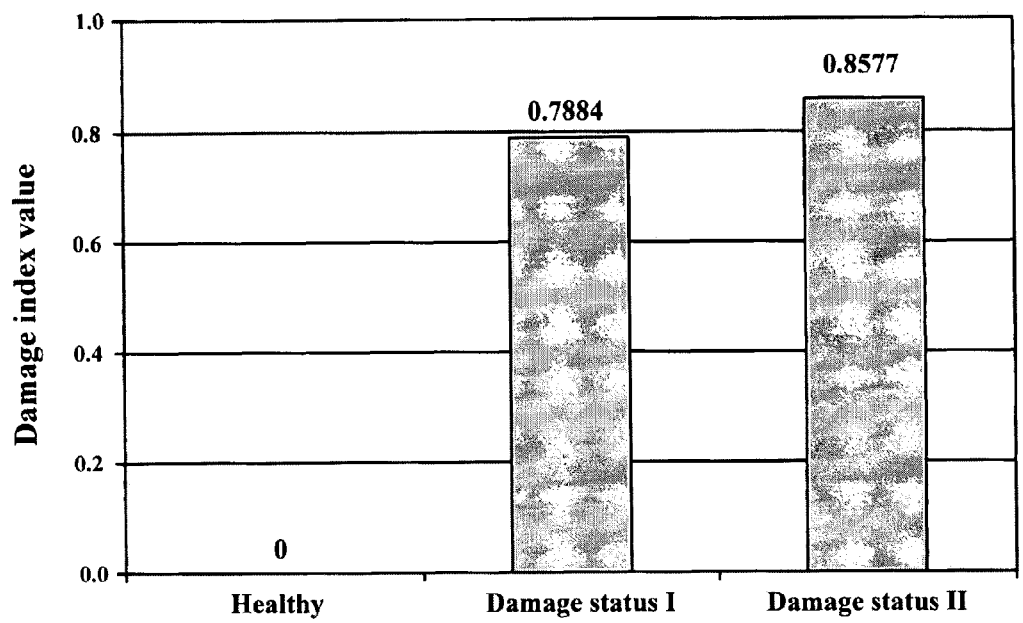
FIG. 31 is a chart of the damage index data for concrete cylinder specimen.

FIG. 31 shows the Damage Index data for the concrete cylinder specimen.

The above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A system for unified monitoring of a concrete structure comprising:
    a concrete structure,
    a plurality of smart aggregate devices embedded in the concrete structure at desired locations, where each device comprises a small concrete housing including a coated piezoceramic transducer apparatus comprising a piezoceramic patch, two wires soldered directly to a top and a bottom of the patch and a waterproof, insulating coating, where the two wires extend out of the housing and are connected to wires extend out of the concrete structure, and where the devices are positioned in the structure before casting so that the waterproof, insulating coating is in direct contact with the concrete of the housing and with the piezoceramic patch;
    a generator coupled to a first smart aggregate device, an actuator device, where the generator is adapted to generate a signal transmitted to the actuator device via its wires inducing its patch to generate a first waveform that propagates through the structure; and
    a monitor coupled to one or more second smart aggregate devices, sensor devices, via their wires, where the monitor receives and evaluates a second waveform received by the sensors devices,
    where the system is adapted for unified monitoring of the concrete structure comprising: (1) early-age performance evaluation including casting, hydration, and strength development using a first harmonic waveform and receiving a second harmonic waveform to determine a harmonic amplitude correlating to a desired compressive strength, and (2) health evaluation including internal stresses, crack detection, and other physical forces in the structures, or an indication of a health of the structure before a failure of the structure can occur or damage index data about the structure during its life using a sine sweep first waveform and receiving a sweep second waveform to determine a damage index.

2. The system of claim 1, wherein the piezoceramic patches comprise lead zirconate titanate.

3. The system of claim 1, wherein the structure is a bridge.

4. The system of claim 1, wherein the structure is a building.

5. The system of claim 1, wherein the structure is a pillar.

6. The system of claim 1, wherein each piezoceramic patch has a volume no greater than a product of its length times its width times its height.

7. A method comprising the steps of:
    coating a plurality of piezoceramic patches with a waterproof insulating material where each patch comprises a piezoceramic transducer and two wires soldered directly to a top and a bottom of the transducer;
    embedding each coated piezoceramic patch in a housing comprising concrete so that the wire extend out past the housing to connect the patch to external devices to form a smart aggregate so that the water-proof, insulating material is the only material between the housing concrete and the piezoceramic patch;
    embedding a plurality of the housings in a structure at distributed locations in the structure, prior to casting;
    casting the structure to form a concrete structure;
    inducing a first waveform in a first piezoceramic transducer of a first housing, where the first waveform comprises a first harmonic waveform for early-stage strength evaluation or the first waveform comprises a first sine sweep waveform for life-time concrete evaluation;
    receiving a second waveform from a second piezoceramic transducer of a second housing, where the second waveform comprises a second harmonic waveform for early-stage strength evaluation or the second waveform comprises a second sine sweep waveform for life-time concrete evaluation; and
    evaluating the second waveform to determine properties of the concrete structure during early-age strength development, where the properties comprise at least an amplitude of the second harmonic waveform correlating to a compressive strength of the concrete structure, after full strength development and during a life-time of the concrete structure, where the properties comprises at least a damage index.

8. The method of claim 7, wherein the structure concrete and the housing concrete are the same type of concrete.

9. The method of claim 8, wherein the step of embedding the housing occurs prior to the poring or the curing of the concrete.

10. The method of claim 7, wherein the piezoceramic transducers are composed of lead zirconate titanate.

11. The method of claim 7, wherein the housing comprises a concrete block.

12. A system for unified monitoring a structure comprising:
a plurality of blocks, where each block comprises concrete and a coated piezoceramic transducer apparatus, where each apparatus comprises a piezoceramic patch and two wires soldered directly to a top and a bottom of the patch coated with a water-proof, insulating material, where the apparatus is encased in the concrete of the block so that the wires of the patch extend out from the block, where the blocks are adapted to be embedded in a concrete structure at desired locations in the structure so that the water-proof, insulating material is the only material between concrete and the piezoceramic patch;
a waveform generator connected to one of the blocks, the actuator block, via its wires, where the waveform generator is adapted to generate a signal inducing a transducer apparatus inside of one blocks, an actuator block, to generate a first waveform that propagates through the structure, where the first waveform comprises a first harmonic waveform for early-stage strength evaluation or the first waveform comprises a first sine sweep waveform for life-time concrete evaluation; and
a monitor connected to one or more of the other blocks, sensor blocks, via their wires, where the monitor receives and evaluates a second waveform received by one or more of the sensor blocks, where the second waveform comprises a second harmonic waveform for early-stage strength evaluation or the second waveform comprises a second sine sweep waveform for life-time concrete evaluation,
where the system is adapted for unified monitoring of properties of the structure during early-age strength development, where the properties comprise at least an amplitude of the second harmonic waveform correlating to a compressive strength of the concrete structure, and after full strength development and during a life-time of the structure, where the properties comprises at least a damage index.

13. The system of claim 12, wherein the piezoceramic patches are lead zirconate titanate.

14. The system of claim 12, wherein the structure concrete and the housing concrete are the same type of concrete.

15. The system of claim 14, wherein the structure is abridge, building, or a pillar.

16. The system of claim 12, wherein each piezoceramic patch has a volume no greater than a product of its length times it width times its height.

17. A method of fabrication of a smart aggregate comprising the steps of:
soldering two wires directly onto a top and a bottom of a piezoceramic patch,
coating the piezoceramic patch with a water-proof insulating material to form a coated piezoceramic transducer apparatus; and
embedding the coated piezoceramic transducer apparatus into a concrete housing to form the smart aggregate so that the water-proof, insulating material is the only material between the housing concrete and the piezoceramic patch,
where the smart aggregate is adapted for unified monitoring of properties of a concrete structure during early-age strength development and after full strength development and during a life-time of the structure.

18. A method for monitoring the early-age strength monitoring of concrete structure comprising the steps of:
fabricating a plurality of smart aggregate devices, where each device comprises a small concrete housing including a coated piezoceramic transducer comprising a patch and two wires soldered directly to a top and a bottom of the transducer and a water-proof insulating coating, where the wires extend out past the housing for connecting the devices to external devices,
embedding the smart aggregate devices at distributed locations within a concrete structure prior to concrete casting to form a monitoring system within the completed concrete structure so that the water-proof, insulating material is the only material between the housing concrete and the piezoceramic patch,
inducing a first waveform comprising an harmonic excitation having a frequency between 60 kHz and 150 kHz at one of the smart aggregate devices for early-stage evaluation and a sine sweep excitation between 100-10 k Hz,
receiving a response waveform from one or more of the other smart aggregate devices, where the second waveform comprises a second harmonic waveform for early-stage strength evaluation or the second waveform comprises a second sine sweep waveform for life-time concrete evaluation, and
unified monitoring of properties of the structure during early-age strength development, where the properties comprise at least an amplitude of the second harmonic waveform correlating to a compressive strength of the concrete structure and after full strength development and during a life-time of the concrete structure, where the properties comprises at least a damage index.

19. A method for health monitoring of a concrete structure comprising the steps of:
fabricating a plurality of smart aggregate devices, where each device comprises a small concrete housing including a coated piezoceramic transducer apparatus comprising a piezoceramic patch and two wires soldered directly to a top and a bottom of the transducer a water-proof insulating coating, where the wires extend out past the housing for connecting the devices to external devices,
embedding the smart aggregate devices into distributed locations within the concrete structure so that the water-proof, insulating material is the only material between the housing concrete and the piezoceramic patch,
inducing a first waveform comprising a sweep sine over a frequency between 100 Hz and 10 kHz at one of the smart aggregate devices for early-stage evaluation and a sine sweep excitation between 100-10 k Hz,
receiving a response waveform from one or more of the other smart aggregate devices, where the second waveform comprises a second harmonic waveform for early-stage strength evaluation or the second waveform comprises a second sine sweep waveform for life-time concrete evaluation, and
unified monitoring of properties of the structure during early-age strength development, where the properties comprise at least an amplitude of the second harmonic waveform correlating to a compressive strength of the concrete structure and after full strength development and during a life-time of the concrete structure, where the properties comprises at least a damage index.

* * * * *